Jan. 13, 1942.  E. E. WEMP  2,269,965
DUODIRECTIONAL-UNIDIRECTIONAL COUPLING
Filed Oct. 23, 1939  2 Sheets-Sheet 1
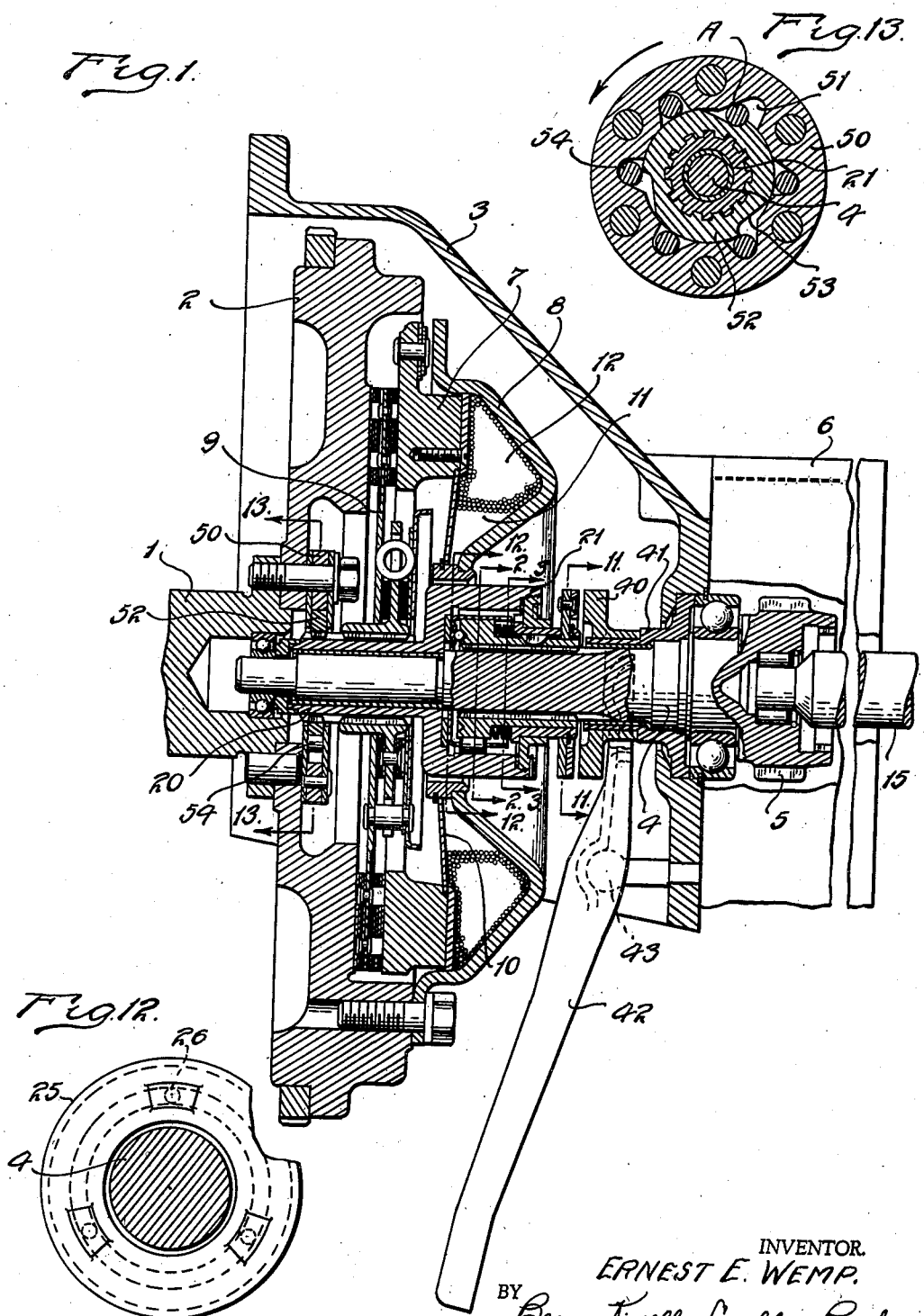
INVENTOR.
ERNEST E. WEMP.
BY Barnes, Kisselle, Laughlin & Raisch
ATTORNEYS.

Jan. 13, 1942.    E. E. WEMP    2,269,965
DUODIRECTIONAL-UNIDIRECTIONAL COUPLING
Filed Oct. 23, 1939    2 Sheets-Sheet 2
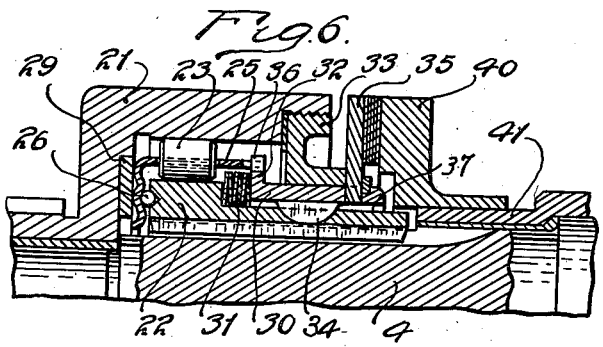
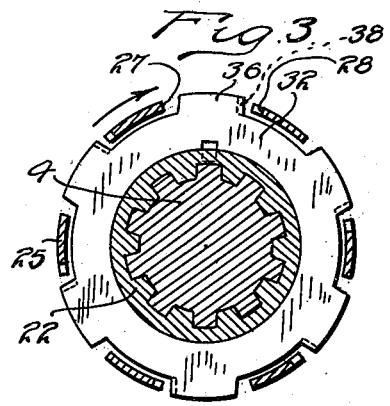
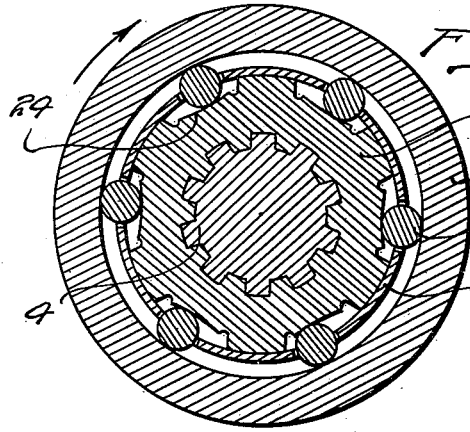
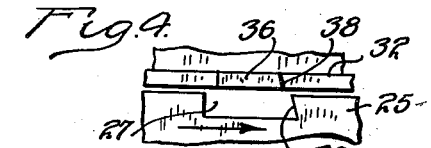
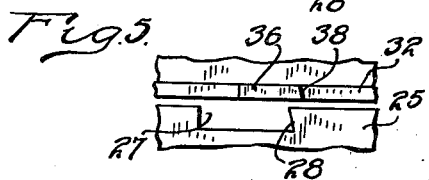
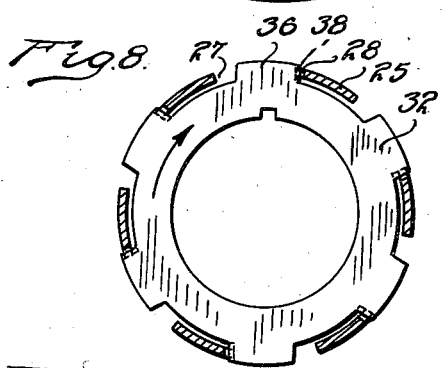
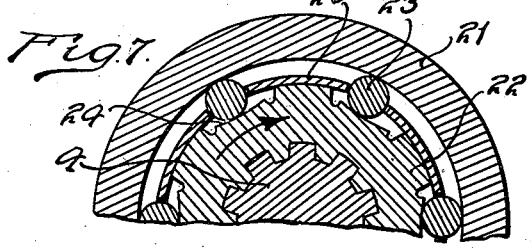
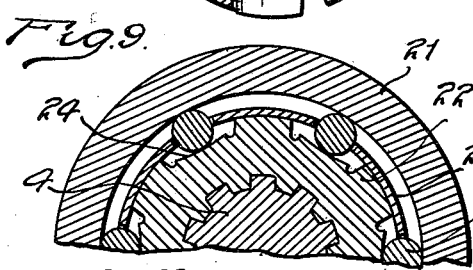
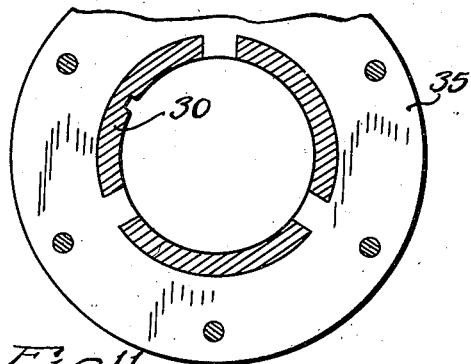
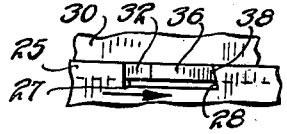
INVENTOR.
ERNEST E. WEMP.
BY Barnes, Kisselle, Laughlin & Raisch
ATTORNEYS.

Patented Jan. 13, 1942

2,269,965

UNITED STATES PATENT OFFICE 2,269,965

DUODIRECTIONAL-UNIDIRECTIONAL COUPLING

Ernest E. Wemp, Detroit, Mich.

Application October 23, 1939, Serial No. 300,739

11 Claims. (Cl. 192—47)

This invention relates to a torque transmitting connection for transmitting the driving action from one rotary element to another, and it is directed particularly toward the provision of an improved and simplified arrangement which can be controlled to establish a duo-directional or uni-directional coupling.

The structure is one which may be placed between the engine and the traction wheels of an automotive vehicle so that, in one condition, the engine may drive the vehicle, and upon reversal of torque, the traction wheels may drive the engine, while in another condition there is a unidirectional coupling which preferably is arranged so that the engine may drive the vehicle and so that the traction wheels of the vehicle may overrun the engine. This latter arrangement is frequently referred to as a freewheeling action. As will appear later, the arrangement may be employed for the purpose of shifting speed change gears of a transmission and is particularly useful in an arrangement where the clutch is one of an automatic nature and not designed to be released for gear changes.

In accordance with the invention, a clutch of the ball or roller type is incorporated in the structure, and the clutch is arranged so that the torque may be transmitted through the balls or rollers in opposite directions. The structure, however, includes controlling features capable of rendering the balls or rollers ineffective for transmitting force in one direction to thus establish the uni-directional drive. Preferably, the arrangement is such that there is a normal duo-directional coupling which can be conditioned for a uni-directional coupling so that, for example, the traction wheels of the vehicle may overrun the engine, and this condition will be maintained so long as there is a tendency for the vehicle and traction wheels to overrun the engine. However, upon torque reversal, that is when the engine tends to drive the vehicle, the structure automatically conditions itself to establish the duo-directional drive, unless the operator deliberately elects to maintain the uni-directional drive by the continued application of controlling force. An arrangement for carrying out the invention is disclosed in the accompanying drawings.

Fig. 1 is a cross sectional view illustrating an engine flywheel, a clutch and transmission, with the drive coupling of the present invention.

Fig. 2 is a cross sectional view taken substantially on line 2—2 of Fig. 1 showing the roller clutch.

Fig. 3 is a cross sectional view taken substantially on line 3—3 of Fig. 1 showing control elements.

Fig. 4 is a lay-out in the nature of a plan view showing control elements illustrated in Fig. 3 in one position.

Fig. 5 is a view similar to Fig. 4 showing the control elements in another position.

Fig. 6 is an enlarged cross sectional view illustrating details of construction.

Fig. 7 is a view similar to Fig. 2 illustrating the roller clutch under conditions of torque reversal.

Fig. 8 is a cross sectional view similar to Fig. 3 showing parts in interlocked relationship.

Fig. 9 is a view similar to Figs. 2 and 7 showing an intermediate position of the rollers of the clutch.

Fig. 10 is a lay-out in plan similar to Figs. 4 and 5 showing some of the parts in interlocked relationship.

Fig. 11 is a cross sectional view taken substantially on line 11—11 of Fig. 1 showing the friction disc and its hub structure.

Fig. 12 is a cross sectional view taken substantially on line 12—12 of Fig. 1 showing a cage or retainer arrangement for the clutch rollers.

Fig. 13 is a cross sectional view taken substantially on line 13—13 of Fig. 1.

In Fig. 1 the crank-shaft of an engine is illustrated at 1, while the flywheel is illustrated at 2 and a bell housing for the clutch at 3. A driven member 4 is piloted in the crank-shaft, and one end is in the form of a gear at 5 and is disposed within the usual case or housing 6 for a gear change transmission. This arrangement may be used in an automotive vehicle and a driving or propeller shaft is shown at 15.

The clutch is of the centrifugal type designed to be released at engine idling speeds and at rest, and to engage at an R. P. M. above the idling speed. The clutch is covered in detail in application Serial No. 300,738, filed October 23, 1939, but will be briefly discussed herein, it being understood that any clutch structure of this general type may be used with the coupling of the invention. A pressure plate 7 is mounted to rotate with the flywheel, and a cover plate 8 is bolted to the flywheel. A driven disc is illustrated at 9 and it has facing material designed to be packed between the flywheel and the pressure plate. A spring of the Belleville washer type, as illustrated at 10, is arranged to retract the pressure plate axially from the flywheel for clutch disengagement, and the pressure plate, cover plate and spring cooperate to define a chamber 11 in which is confined a mechanical fluid such as a multiplicity of metal balls or shot illustrated at 12.

Upon adequate rotation, the balls or shot shift outwardly and act as a fluid to create centrifugal head upon the pressure plate to shift it toward the left, as shown, for clutch engagement. Upon deceleration substantially to a predetermined R. P. M., the spring 10 retracts the pressure plate and the mass of balls or material is caused to flow to fill the inner regions of the chamber. The clutch is shown in engaged position. The outer angular wall of the chamber which is formed by the cover plate serves to change the direction of forces from radial to substantially an axial direction. This is a form of clutch which, while released when at rest and at low R. P. M., is engaged at higher engine speeds, and therefore to permit of change in gears in the transmission 6, some disconnection is required in the power line other than at the clutch.

The driven disc is mounted in driving relation to an extension of a member 20 which becomes the driving member of the coupling, this member 20 having an enlarged cylindrical part 21. The driven member of the coupling is shown at 22 and it is splined to the driven shaft 4. These driving and driven members, in effect, constitute portions of a clutch of the ball or roller type, and as shown herein a plurality of clutch rollers 23 are confined between these two members. The member 22 is formed with a recess for each roller, with the greatest depth of each recess being in its intermediate portion so that the distance to the adjacent interior surface of the member 21 is sufficient to clear the roller, while the recess has less depth on opposite sides of the intermediate portion to cause the roller to wedge between the members. This formation will be appreciated by reference to Fig. 2 where the bottom surface of the recess, as shown at 24, is formed so that the greatest depth is in its intermediate portion with the recesses being more shallow toward each end.

The rollers are confined by a retainer 25 shown herein as being in the form of a cup having apertures for the rollers. At this point it may be said that the use of the term roller herein, is to be construed as covering balls, because a ball is a rolling element, and elements which are specifically balls or specifically rollers may be used in a coupling of this character. The end of the cup is fashioned to provide a recessed formation as shown in Figs. 1 and 6 for the reception of thrust balls 26 (Figs. 6 and 12). The bottom of the cup frictionally engages the member 21, for which purpose a frictional substance 29 may be employed. The edge of the retainer cup for the rollers is provided with a number of recesses or cut out portions 27 (Fig. 4) one or all of which is preferably undercut as at 28 for reasons which will presently appear.

Slidably keyed to the member 22 is a control member 30, this being accomplished by a key 34 on the member 22 which lies in a keyway 37 in member 30. Between the member 30 and an enlarged portion of the member 22 is a spring structure 31 which, as shown, comprises a plurality of superposed washers which may be of the Belleville type, but which may be of other spring formation. The member 30 has a shoulder 32, and it is held in assembly by a nut 33 screwthreaded to the member 21. The expansion tendencies of the spring urge the member 22 to the left as Figs. 1 and 6 are viewed, and the member 30 to the right, so that these members are normally held separated, but the thrust is balanced out locally through the balls 26, and the nut 33 and thence into the member 21.

The control member 30 is provided with a friction disc 35 non-rotatably secured thereto as shown in Fig. 11, and it may be provided with a friction facing as illustrated. The member 30 at its shoulder 32 is provided with a plurality of fingers 36 corresponding in number to the notches 27 on the retainer, but of smaller circumferential extent as shown in Figs. 4 and 5. One side of each finger is preferably angularly disposed as shown at 38 to substantially correspond to the undercut 28.

A thrust member 40 is slidably mounted, as for example, on the tubular extension 41 and it is shiftable axially by a control member 42 which, as shown in Fig. 1, is in the form of a lever pivoted as at 43, and it has a yoked end as illustrated for engaging the member 40 on opposite sides of the tubular extension thereof. The member 40 is held from rotation, preferably, and the yoke may perform a function of holding the member 40 against rotation by engaging parts on opposite sides thereof in a well-known manner.

Before proceeding with the operation of this arrangement, reference may be had to the auxiliary structure for connecting the flywheel to the driven member 20 as illustrated in Fig. 13.

As above pointed out the clutch is disengaged when at rest, but there may be times when it is desired to start the engine by pushing or towing the vehicle, or to use the engine compression as a parking agency. Attached to the flywheel is an outer ring element 50 having notches 51, and attached to the driven member 20 is an inner member 52 with notches 53, and a roller element 54 is provided for each of the notches 51. The normal direction of rotation is counter-clockwise as Fig. 13 is viewed, and when the engine is operating all the rollers are held centrifugally in the notches 51 out of contact with the member 52, and therefore ineffective. When at rest, however, one of the rollers, such as the roller A, may drop partially into a notch 53 as indicated. The roller A is shown in a driving position so that counter-clockwise motion of the member 52 transmits the torque and drive to the member 50 and therefore turns the engine. When the engine starts to rotate, the ball A is shifted along the surface of the notch 53 and is cammed into its notch 51. This structure may or may not be used with the arrangement and is only one form of a device of this nature.

The operation of the device is as follows: Normally, the control element 30 is held spaced from the roller cage by the spring 31, as shown in Fig. 1. In this position, the notches 27 and fingers 36 are spaced axially from each other as shown in Figs. 4 and 5. Clockwise rotation of the member 21, which occurs upon engagement of the centrifugal clutch, causes like shift of the roller cage by reason of the frictional engagement at 29, and the rollers are thus caused to shift with the cage and ride up the inclined surfaces 24 to a position substantially as illustrated in Fig. 2. Of course, the rollers may have already been in the Fig. 2 position at the start of the engine. In this position the rollers are wedged between the members 21 and 22 and a driving connection is established. Upon reversal of torque, in which action the member 21 tends to rotate counter-clockwise relative to the member 22, or the member 22 tends to rotate clockwise faster than the member 21, these two members shift to the relative positions shown in Fig. 7 with the balls again being wedged in between the members and a drive established for the transmission of torque from the driven member to the driving member. Thus there is a duo-directional drive with, however, a slight relative oscillation occurring upon torque reversal.

With the torque coming from the driving member as shown in Fig. 2, the notches 27 and fingers 36 may be aligned substantially as shown in Figs. 3 and 4. With the torque reversed as shown in Fig. 7, the cage shifts so that the notches may be positioned relative to the fingers 36, as shown in Fig. 5.

In the forward driving condition, that is with the coupling established as shown in Fig. 2, the parts may be conditioned to establish a uni-directional drive. This is accomplished by means of an operation, manually or otherwise, of the lever 42 to shift the thrust member 40 to the left as Fig. 1 is viewed, causing it to engage the member 35 and to shift it to the left against the pressure of spring 31. This places the fingers 36 in the notches. Now upon a reversal of torque the cage can shift counter-clockwise relative to the driven member only to that extent permitted by the fingers 36, and the inclined surfaces butt up against the fingers as shown in Fig. 10. The rollers of the clutch are now substantially in the position shown in Fig. 9 located in the deepest part of the recessed formation, and accordingly, the member 22 may rotate in a clockwise direction faster than the driving member 21. In other words, a freewheeling arrangement is established and the engine may be decelerated with the vehicle overrunning the same. A change of selective gears may now be made. This uni-directional drive will be maintained so long as the control member 30 is thus held inwardly. Upon acceleration of the engine the cage may again shift back to the Fig. 4 position with the rollers establishing a drive as shown in Fig. 2, but at this time the fingers 36 still lie within the notches. If the pressure on the member 30 be relieved at this time, the fingers are moved out of the notches and the parts conditioned for the duo-directional drive. On the other hand, an automatic return to the duo-directional drive may be obtained. Assuming that the member 30 has been shifted to the Fig. 6 position, and the engine decelerated so that the uni-directional drive is established as shown in Figs. 8, 9 and 10, the pressure on the member 30 may be relieved. Of course, the spring tends to shift the member 30 out of engagement with the notches, but the friction at 29 is sufficient to hold the cage against rotation so that the undercut surfaces 28 and 38 prevent disengagement of the notches and fingers. Thus the uni-directional condition is maintained so long as there is an overrunning action. However, upon torque reversal the member 30 is automatically ejected by the spring 31 by reason of the cage shifting to or toward the Fig. 4 position as it is carried frictionally with the driving member 21. The friction between the parts 40 and 35 functions to decelerate the driven member 4 upon shift of gears in transmission 6 which breaks a driving connection between shafts 4 and 15. This facilitates establishment of a dental engagement in the transmission.

I claim:

1. Coupling mechanism for transmitting torque comprising two rotary members, roller clutching elements, said members having surfaces cooperating with the clutching elements so that the clutching elements are engaged therebetween when the torque is in one direction and engaged therebetween when the torque is reversed with the members having limited relative rotary movement upon such torque reversal, whereby the rollers establish a duo-directional connection, said surfaces arranged to provide an intermediate neutral position for the rollers, a cage for the rollers, means forming a surface to surface sliding frictional engagement between the cage and one of the members for shifting the roller elements upon torque reversal from one driving position to another driving position, control means operable to limit movements of the cage from one driving position of the roller elements to the neutral position of the roller elements upon torque reversal to establish a uni-directional drive connection and means normally holding the control means in ineffective position.

2. Coupling mechanism for transmitting torque comprising, two rotary members at least one of which is provided recesses having surfaces for engaging roller clutch elements, a single set of roller clutch elements between the members for establishing a duo-directional driving connection between the members, a cage for the roller elements which is shiftable with one member relative to the other member upon torque reversal, for shifting the roller elements from one driving condition to another, the members being arranged to form an intermediate neutral position for the roller elements between the two driving positions thereof, a control member shiftable to block the cage and limit its movements substantially from one driving position of the roller elements to the neutral position thereof for establishing a uni-directional drive connection, spring means against which the control member is shiftable into blocking position relative to the cage and under-cut engaging surfaces between the cage and control element for maintaining such engagement against the action of the spring means during torque reversal.

3. Coupling mechanism for transmitting torque comprising, a rotary driving member having a smooth internal circumferential surface, a rotary driven member having recesses with surfaces facing the said surface of the first member, roller elements in the recesses and positioned between the members and arranged to establish a duo-directional drive between the members by engaging opposite surfaces of the recesses and the said surface of the first member, and having a neutral position substantially in the deepest portion of the recesses, whereby the members have relative rotation upon torque reversal, a cage for the roller elements having surfaces in sliding and frictional engagement with the rotary driving member so that the cage substantially follows movement of the driving member upon torque reversal for shifting the roller elements from one clutching position to another past the intermediate neutral position, and a control member shiftable to limit movement of the cage upon torque reversal from one clutching position of the roller elements to the neutral position for establishing a uni-directional drive connection.

4. Coupling mechanism for transmitting torque comprising, a rotary member having an internal circumferential surface, a second rotary member having recesses with surfaces facing the said surface of the first member, roller elements in the recesses and positioned between the members and arranged to establish a duo-directional drive between the members by engaging opposite surfaces of the recesses and the said surface of the first member, and having a neutral position substantially in the deepest portion of the recesses, whereby the members have relative rotation upon torque reversal, a cage for the roller elements frictionally associated with the first rotary member so that the cage substantially follows movement of the first rotary member upon torque reversal for shifting the roller elements from one clutching position to another past the intermediate neutral position, a control member slidably keyed to the second rotary member, the cage and control member having interengaging formations, spring means holding the cage and control member axially separated, and means for shifting the control member to interengage the formations to limit movements of the cage upon torque reversal substantially from one clutching position of the roller elements to the neutral position thereof for a uni-directional drive.

5. Coupling mechanism for transmitting torque comprising, a rotary member having an internal circumferential surface, a second rotary member having recesses with surfaces facing the said surface of the first member, roller elements in the recesses and positioned between the members and arranged to establish a duo-directional drive between the members by engaging opposite surfaces of the recesses and the said surface of the first member, and having a neutral position substantially in the deepest portion of the recesses, whereby the members have relative rotation upon torque reversal, a cage for the roller elements frictionally associated with the first rotary member so that the cage substantially follows movement of the first rotary member upon torque reversal for shifting the roller elements from one clutching position to another past the intermediate neutral position, a control member slidably keyed to the second rotary member, the cage and control member having interengaging formations, spring means holding the cage and control member axially separated, and means for shifting the control member to interengage the formations to limit movements of the cage upon torque reversal substantially from one clutching position of the roller elements to the neutral position thereof for a uni-directional drive, said interengaging elements including under-cut surfaces for maintaining the engagement against the action of the spring throughout the continuance of torque reversal.

6. Coupling mechanism for transmitting torque comprising a first rotary member, a second rotary member, at least one of the rotary members being formed to provide pockets between the members, a set of roller clutch elements in the pockets, the pockets having the greatest depth in an intermediate portion for substantially clearing the clutch elements and having less depth at opposite sides for wedging the clutch elements therebetween to establish a duo-directional drive between the members with the members having relative rotation upon torque reversal, a cage for the clutch elements having a frictional engagement with one rotary member for shifting the roller clutch elements from one driving position to another upon torque reversal, a control member slidably keyed to the other rotary member, the cage and control member having intrengaging formations for limiting movements of the cage to and from one driving position of the clutch elements and the intermediate neutral position for the establishment of a uni-directional connection, spring means normally holding the cage and control element separated, and means for urging the control element toward the cage to interengage said formations.

7. Coupling mechanism for transmitting torque comprising, a rotary driving member having a circumferential inner surface, a rotary driven member disposed therein and having recesses, a roller clutch element in each recess, the roller clutch elements being arranged to wedge between the circumferential surface and surfaces of the recesses for the establishment of a duo-directional connection between the members and said roller clutch elements having a clearance when disposed in the intermediate deeper portions of the recesses, a cage for the roller elements frictionally associated with the driving member for shifting the clutch elements upon torque reversal from one driving position to another, a control element keyed to the driven member, the cage and control element having interengaging recesses and teeth, spring means for holding the cage and control element separated, and means for shifting the control element to interengage the recesses and teeth for limiting the movements of the cage to and from one driving position of the roller elements and the intermediate free position to establish a uni-directional drive connection between the members.

8. Coupling mechanism for transmitting torque comprising, a rotary driving member having a circumferential inner surface, a rotary driven member disposed therein and having recesses, a roller clutch element in each recess, the roller clutch elements being arranged to wedge between the circumferential surface and surfaces of the recesses for the establishment of a duo-directional connection between the members and said roller clutch elements having a clearance when disposed in the intermediate deeper portions of the recesses, a cage for the roller elements frictionally associated with the driving member for shifting the clutch elements upon torque reversal from one driving position to another, a control element keyed to the driven member, the cage and control element having interengaging recesses and teeth, spring means for holding the cage and control element separated, and means for shifting the control element to interengage the recesses and teeth for limiting the movements of the cage to and from one driving position of the roller elements and the intermediate free position to establish a uni-directional drive connection between the members, said interengaging recesses and teeth having under-cut engaging surfaces for maintaining such engagement against the action of the spring means so long as the cage is held in the intermediate position by the frictional engagement with the driving member.

9. Coupling mechanism for transmitting torque comprising, a rotary driving member having an internal surface, a rotary driven member within the driving member and having recesses facing the surface of the driving member, roller elements in the recesses and arranged to establish duo-directional drive between the members by engaging opposite surfaces of the recesses and the internal surface of the driving member, the rollers having a neutral non-driving position in an intermediate relatively deep portion of the recesses, whereby the members have limited relative rotation upon torque reversal, a cage for the rollers, surface to surface frictional engaging means between the cage and the driving member so that the cage substantially follows the driving member during the limited relative rotation of the members, a control member slidably keyed to the driven member, interengaging means between the control member and the cage for limiting the shift of the cage from one driving position of the rollers to the neutral position of the rollers for establishing a uni-directional drive connection, and friction means engageable with the control member to shift the same and for decelerating the driven member when the roller elements are in neutral position.

10. Coupling mechanism for transmitting torque comprising, a rotary driving member having an internal surface, a rotary driven member within the driving member and having recesses facing the surface of the driving member, roller elements in the recesses and arranged to establish duo-directional drive between the members by engaging opposite surfaces of the recesses and the internal surface of the driving member, the rollers having a neutral non-driving position in an intermediate relatively deep portion of the recesses, whereby the members have limited relative rotation upon torque reversal, a cage for the rollers, surface to surface frictional engaging means between the cage and the driving member so that the cage substantially follows the driving member during the limited relative rotation of the members, a control member slidably keyed to the driven member, interengaging means between the control member and the cage for limiting movements of the cage from one driving position of the rollers to the intermediate position for establishing a uni-directional drive, means normally holding the control member disengaged from the cage, and friction means operable to engage and shift the control member into engagement with the cage to establish uni-directional drive and for decelerating the driven member when the rollers are in neutral position.

11. Coupling mechanism for transmitting torque comprising, a rotary driving member, a rotary driven member, one of the members having recesses facing a surface of the other member, roller clutching elements in the recesses and arranged to establish a duo-directional drive between the members by engaging opposite surfaces of the recesses and the said surface of the other member, the rollers having a neutral non-driving position in an intermediate relatively deep portion of the recesses, whereby the members have limited relative rotation upon torque reversal, a cage for the rollers, surface to surface frictional engaging means between the cage and one member so that the cage substantially follows said one member during the limited relative rotation of the members, a control member slidably keyed to the other member, interengaging means between the control member and the cage for limiting the shift of the cage from one driving position of the rollers to the neutral position of the rollers for establishing a uni-direction drive connection, and friction means engageable with the control member to shift the same and for decelerating the driven member when the roller elements are in neutral position.

ERNEST E. WEMP.